April 2, 1940.   C. M. CAULK   2,195,765
PLANT SETTER
Filed Aug. 23, 1938   3 Sheets-Sheet 2

Inventor
C. M. Caulk
By Clarence A. O'Brien
and Hyman Berman
Attorneys

April 2, 1940.   C. M. CAULK   2,195,765
PLANT SETTER
Filed Aug. 23, 1938   3 Sheets-Sheet 3

Inventor
C. M. Caulk

By Clarence A. O'Brien
and Hyman Berman
Attorneys

Patented Apr. 2, 1940

2,195,765

UNITED STATES PATENT OFFICE 2,195,765

PLANT SETTER

Clayton M. Caulk, Finley, Ky., assignor of one-half to L. A. Caulk, Campbellsville, Ky.

Application August 23, 1938, Serial No. 226,394

4 Claims. (Cl. 111—4)

This invention relates to a plant setter, and has for the primary object the provision of a portable device of this character which will form a hole in the ground and deposit therein a plant in an upright position along with a desired amount of water and permit tamping of the soil about the roots of the plant to assure growth thereof, all of which operations may be carried out with ease and quickness.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation of a plant setter constructed in accordance with my invention.

Figure 1:
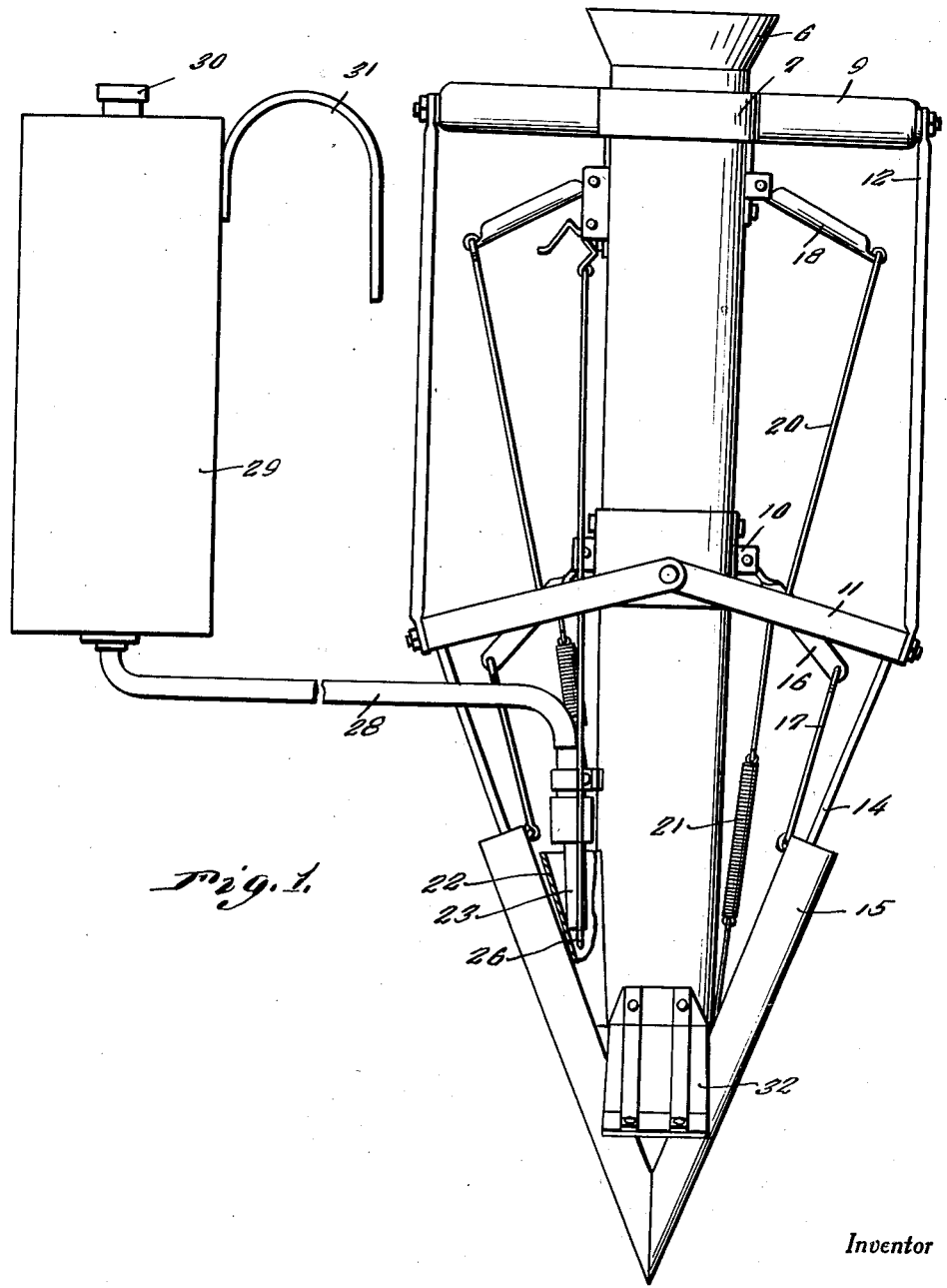

Referring in detail to the drawings, the numeral 5 indicates a tube having an internal diameter sufficient to permit a plant to easily slide through said tube. One end of the tube is flared, as shown at 6, to facilitate the insertion of a plant in the tube with the roots of the plant entering the tube first.

A collar 7 is mounted on the tube 5 adjacent the flared end 6 and is held on the tube by bolts 8 extending through the tube and collar and arranged in opposed relation on which hand grips 9 are mounted.

A sleeve 10 is mounted on the tube 5 intermediate the ends of the latter and has secured thereto opposed outwardly and downwardly extending supporting members 11 which are connected to the bolts 8 by tie rods 12.

Figure 2:
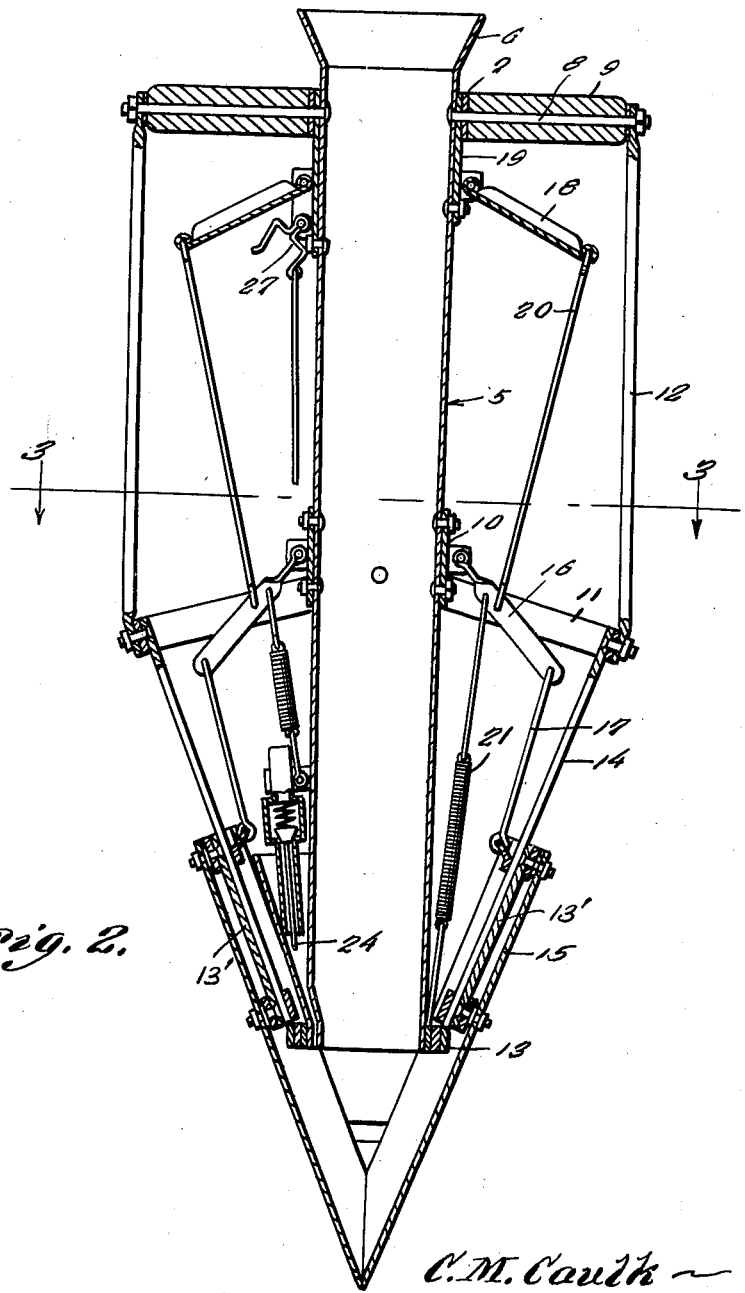
Figure 2 is a vertical sectional view illustrating the device.
Figure 3:
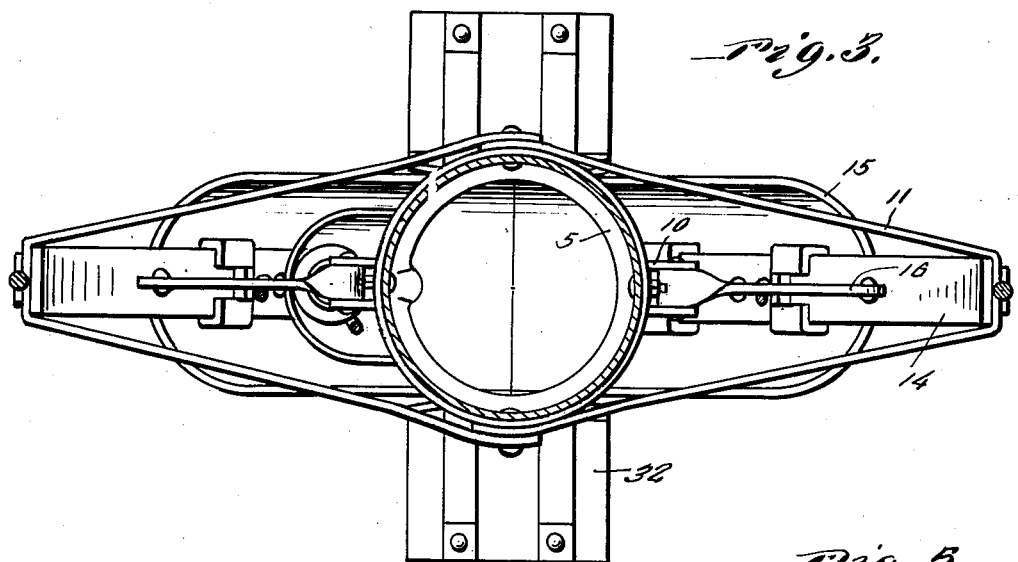
Figure 3 is a sectional view taken on line 3—3 of Figure 2.
Figure 4:
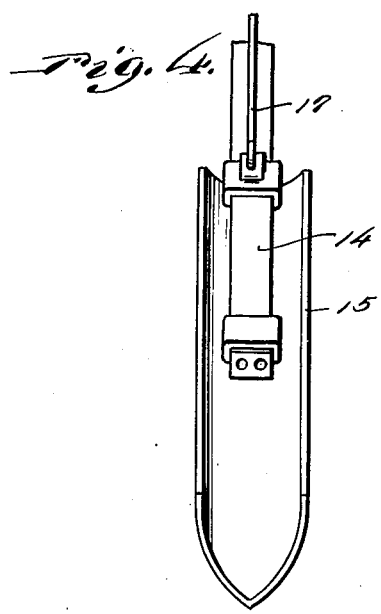
Figure 4 is a fragmentary side elevation illustrating one of the shovel elements.
Figure 5:
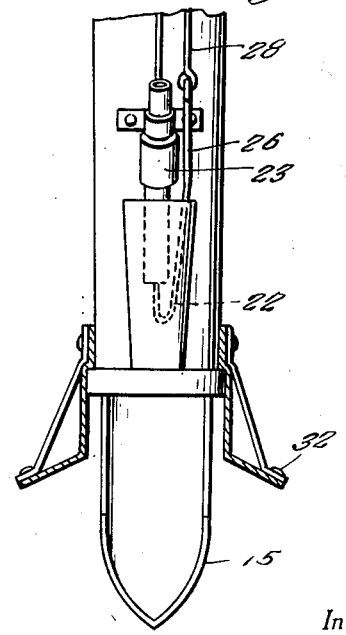
Figure 5 is a fragmentary side elevation, partly in section showing the soil tamping members.

A collar 13 is welded or otherwise secured on the discharge end of the tube and has welded or otherwise secured thereto upwardly and outwardly extending guide members 14, the upper ends of which are secured to the outer ends of the supporting members 11. Elongated shovel elements 15 are slidably mounted on the guide members 14 and are arranged thereby in converging relation, as clearly shown in Figures 1 and 2. Strips 13' are secured on the shovel elements and slide on the guide members 14 during the sliding of the shovel elements and are provided with slotted end portions through which the guide members 14 extend. The collar 13 limits the downward movement of the shovel elements permitting their lower ends to come in contact with each other which are cut on a bevel and sharpened to facilitate the insertion of the shovel elements into the ground when arranged in V-shaped formation as shown in Figures 1 and 2. The shovel elements when positioned as shown in said Figures 1 and 2 prevent a plant positioned in the tube 5 from moving entirely out of said tube by way of the lower end of the tube.

Levers 16 are pivoted on the collar 10 and are connected to the shovel elements 15 by links 17. Operating handles 18 are pivotally mounted on extensions 19 formed on the collar or sleeve 7 and are connected to the levers 16 by links 20. Coil springs 21 are connected to the lower portion of the tube 5 and to the levers and act to urge the levers downwardly thereby setting the shovel elements in engagement with each other, as shown in Figures 1 and 2. In this position the shovel elements may be readily inserted in the ground with a plant lying in the tube. After the shovel elements have been inserted in the ground to a desired depth the grips 18 are raised upwardly elevating the levers 16 and drawing the shovel elements upwardly on the guide members 14 leaving the plant positioned in the hole of the ground in an upright position. The operator grasps the grips 9 with the hand for insertion of the shovel elements into the ground and to operate the hand grips 18 fingers of the hands of the operator may be brought into engagement therewith and contracted or drawn towards the grips 9 to elevate the shovel elements.

A funnel-like member 22 is mounted on the lower portion of the tube 5 and has extending therein the discharge end of a valve 23 which is of the self-seating type and includes a stem 24 which extends outwardly of the discharge end of the valve and is bent upwardly exteriorly of the valve to form an operating rod 26 for the unseating or opening of the valve. An operating handle 27 is pivotally mounted on one of the members 19 of the collar 7 and is connected to the operating member 26 of the valve by a connecting link 28. The operating handle or lever 27 is located adjacent one of the shovel operating handles 18 so that the operator can conveniently place the finger in engagement therewith for opening the valve when desired. A flexible pipe 28 is connected to the valve and to the bottom of a water supply tank 29. The tank has a filling spout 30 on the upper end thereof and is also equipped with shoulder engaging members 31 adapted to be placed over the shoulders of the operator with the tank resting against the back of the operator.

After the plant has been placed in an upright position in the hole in the ground and with the shovel elements raised into an elevated position the valve 24 is opened by the operator to permit a desired amount of water to be discharged into the hole about the plant.

Arranged on opposite sides of the tube 5 and adjacent the lower end thereof are tamping members 32 which may be brought into engagement with the ground when the shovel elements are in an elevated position to permit the operator handling the device to readily tamp the soil or ground about the roots of the plant positioned in the hole.

It is believed that the foregoing description, when taken in connection with the drawings will fully set forth the construction and advantages of this invention to those skilled in the art to which such a device relates, so that further detailed description will not be required.

What is claimed is:

1. A plant setter comprising a tube having a receiving end and a discharge end, upwardly and outwardly extending guide members mounted on said tube, shovel elements having pointed ends and slidably mounted on the guide elements and arranged in converging relation and capable of having the pointed ends thereof to come in contact with each other below the discharge end of the tube for facilitating the insertion of the shovel elements into the ground to form a hole and to prevent a plant from moving fully out of the tube by way of the discharge end thereof, levers pivotally mounted on the tube, means connecting the levers to the shovel elements, spring means connected to said levers for normally positioning the shovel elements with the free ends thereof in engagement and positioned below the discharge end of the tube, operating handles pivotally mounted on the tube and connected to said levers to permit manual actuation of the shovel elements upwardly with respect to the discharge end of the tube for depositing a plant in the hole, and hand grips mounted on the tube adjacent the operating handles.

2. A plant setter comprising a tube having a receiving end and a discharge end, upwardly and outwardly extending guide members mounted on said tube, shovel elements having pointed ends and slidably mounted on the guide elements and arranged in converging relation and capable of having the pointed ends thereof to come in contact with each other below the discharge end of the tube for facilitating the insertion of the shovel elements into the ground to form a hole and to prevent a plant from moving fully out of the tube by way of the discharge end thereof, levers pivotally mounted on the tube, means connecting the levers to the shovel elements, spring means connected to said levers for normally positioning the shovel elements with the free ends thereof in engagement and positioned below the discharge end of the tube, operating handles pivotally mounted on the tube and connected to said levers to permit manual actuation of the shovel elements upwardly with respect to the discharge end of the tube for depositing a plant in the hole, hand grips mounted on the tube adjacent the operating handles, a funnel-like member mounted on the tube, a valve associated with the funnel-like member, a water supply means connected to said valve, and an operating means for the valve for admitting a desired amount of water into the funnel-like member for direction into the hole in the ground about the plant.

3. A plant setter comprising a tube having a receiving end and a discharge end, upwardly and outwardly extending guide members mounted on said tube, shovel elements having pointed ends and slidably mounted on the guide elements and arranged in converging relation and capable of having the pointed ends thereof to come in contact with each other below the discharge end of the tube for facilitating the insertion of the shovel elements into the ground to form a hole and to prevent a plant from moving fully out of the tube by way of the discharge end thereof, levers pivotally mounted on the tube, means connecting the levers to the shovel elements, spring means connected to said levers for normally positioning the shovel elements with the free ends thereof in engagement and positioned below the discharge end of the tube, operating handles pivotally mounted on the tube and connected to said levers to permit manual actuation of the shovel elements upwardly with respect to the discharge end of the tube for depositing a plant in the hole, hand grips mounted on the tube adjacent the operating handles, a funnel-like member mounted on the tube, a valve associated with the funnel-like member, a water supply means connected to said valve, an operating means for the valve for admitting a desired amount of water into the funnel-like member for direction into the hole in the ground about the plant, tamping elements mounted on the tube at the discharge end thereof for tamping the ground about the plant.

4. A plant setter comprising a tube to receive a plant and adapted to be operated in a substantially vertical position, guide members secured on the lower portion of the tube and extending upwardly and outwardly therefrom, shovels slidable on said guide members and capable of contacting each other below the lower end of the tube, handles secured on the tube, operating means connected with the shovels and pivoted on the tube adjacent the handles, and spring means acting on said operating means to urge the shovels into engagement with each other.

CLAYTON M. CAULK.